(12) United States Patent
Heikenfeld et al.

(10) Patent No.: US 8,693,081 B2
(45) Date of Patent: Apr. 8, 2014

(54) ELECTROFLUIDIC IMAGING FILM, DEVICES, AND DISPLAYS, AND METHODS OF MAKING AND USING THE SAME

(75) Inventors: Jason Heikenfeld, Cincinnati, OH (US); Matthew Hagedon, Cincinnati, OH (US); Kenneth Dean Andrew, Phoenix, AZ (US)

(73) Assignee: University of Cincinnati, Cincinnati, OH (US)

( * ) Notice: Subject to any disclaimer, the term of this patent is extended or adjusted under 35 U.S.C. 154(b) by 259 days.

(21) Appl. No.: 13/248,826

(22) Filed: Sep. 29, 2011

(65) Prior Publication Data

US 2012/0081777 A1 Apr. 5, 2012

Related U.S. Application Data

(60) Provisional application No. 61/388,272, filed on Sep. 30, 2010.

(51) Int. Cl.
| | | |
|---|---|---|
| *G02B 26/08* | (2006.01) | |
| *G02F 1/03* | (2006.01) | |
| *G09G 3/34* | (2006.01) | |
| *B21D 39/03* | (2006.01) | |
| *B01D 57/02* | (2006.01) | |

(52) U.S. Cl.
USPC ........... 359/290; 359/228; 359/245; 359/253; 359/254; 359/292; 359/296; 345/84; 345/107; 445/24; 118/621; 118/629; 29/428; 29/825; 29/829; 204/450; 204/518

(58) Field of Classification Search
USPC ......... 359/228, 245, 253, 254, 290, 292, 296; 345/55, 60, 84, 107, 156, 205, 211, 345/212, 690; 445/24; 118/621, 629; 137/803, 806; 362/296.01; 29/428, 29/825, 829; 204/450, 518
See application file for complete search history.

(56) References Cited

U.S. PATENT DOCUMENTS 6,635,306 B2 10/2003 Steckl et al.
7,123,796 B2 10/2006 Steckl et al.
(Continued)

FOREIGN PATENT DOCUMENTS

WO 02073708 A2 9/2002
WO 03001853 A1 1/2003
(Continued)

OTHER PUBLICATIONS

J. Heikenfeld, et al., "Electrofluidic displays using Young-Laplace transposition of brilliant pigment dispersions," Nature Photonics. 3:292-296 (2009).

(Continued)

*Primary Examiner* — Evelyn A. Lester
(74) *Attorney, Agent, or Firm* — Wood, Herron & Evans, LLP

(57) ABSTRACT

A device and method of making and using the same. The device includes first and second substrates that are spaced to define a fluid space. Polar and non-polar fluids occupy the fluid space. A first electrode, with a dielectric layer, is positioned on the first substrate and electrically coupled to at least one voltage source, which is configured to supply an electrical bias to the first electrode. The fluid space includes at least one fluid splitting structure that is configured to facilitate the movement of the non-polar fluid into a portion of the polar fluid. Fluid splitting structure assisted movement of the non-polar fluid splits the polar fluid.

34 Claims, 9 Drawing Sheets

(56) References Cited

U.S. PATENT DOCUMENTS

| | | |
|---|---|---|
| 7,430,355 B2 | 9/2008 | Heikenfeld et al. |
| 7,872,790 B2 | 1/2011 | Steckl et al. |
| 8,089,013 B2 | 1/2012 | Steckl et al. |
| 2002/0125495 A1 | 9/2002 | Steckl et al. |
| 2002/0125821 A1 | 9/2002 | Steckl et al. |
| 2006/0077330 A1 | 4/2006 | Ijzerman et al. |
| 2007/0039832 A1 | 2/2007 | Heikenfeld |
| 2007/0279347 A1 | 12/2007 | Muneyoshi et al. |
| 2008/0100922 A1 | 5/2008 | Choi et al. |
| 2008/0174846 A1 | 7/2008 | Morozumi et al. |
| 2008/0225374 A1 | 9/2008 | Hayes et al. |
| 2009/0232509 A1 | 9/2009 | Heikenfeld et al. |
| 2010/0053717 A1 | 3/2010 | Takahashi |
| 2010/0208328 A1* | 8/2010 | Heikenfeld et al. ......... 359/290 |
| 2013/0128336 A1* | 5/2013 | Dean et al. ................. 359/290 |

FOREIGN PATENT DOCUMENTS

| | | |
|---|---|---|
| WO | 2005057261 A2 | 6/2005 |
| WO | 2005114740 A1 | 12/2005 |
| WO | 2006017129 A2 | 2/2006 |
| WO | 2007022311 A2 | 2/2007 |
| WO | 2008039832 A2 | 4/2008 |
| WO | 2009036272 A1 | 3/2009 |
| WO | 2010104392 A1 | 9/2010 |
| WO | 2010104606 A1 | 9/2010 |
| WO | 2011020013 A1 | 2/2011 |
| WO | 2011020020 A2 | 2/2011 |

OTHER PUBLICATIONS

T. Krupenkin and J. A. Taylor, "Reverse electrowetting as a new approach to high-power energy harvesting," Nature Communications, 2:7322 (2011).

S. Yang, et al., "High reflectivity electrofluidic pixels with zero-power grayscale operation," Appl. Phys. Lett. 97 (14):143501-1 to 143501-3 (2010).

J. Heikenfeld, et al., "A critical review of the present and future prospects for electronic paper," J. Soc. Inform. Display. 19(2):129-156 (2011).

M. Dhindsa et al., "Virtual electrowetting channels: electronic liquid transport with continuous channel functionality." Lab on a Chip. 10(7): (2010), pp. 832-836.

United States Patent and Trademark Office, International Search Report and Written Opinion in corresponding International Application No. PCT/US11/54267, mailed Jun. 21, 2012, 12 pages.

Heikenfeld, "Electrofluidic Textiles," U.S. Appl. No. 60/699,833 (2005), 23 pp.

Heikenfeld, "A Novel Cleaning Device Utilizing Electrofluidics," U.S. Appl. No. 60/709,026 (2005), 18 pp.

Heikenfeld, "Arrayed Electrofluidic Membranes for Biomimetics, Biocountermeasures, Proteomics, and Drug Discovery," U.S. Appl. No. 60/782,021 (2006), 10 pp.

Heikenfeld, et al., "Cylindrical Electrowetting Systems for Flat Optics," U.S. Appl. No. 60/746,431 (2006), 25 pp.

Heikenfeld, "Advanced Electrowetting Display Architectures, Materials, and Methods of Manufacture," U.S. Appl. No. 60/829,008 (2006), 54 pp.

Heikenfeld, "Electrofluidic Chromatophores," U.S. Appl. No. 61/055,792 (2008), 82 pp.

Heikenfeld, "Electrofluidic Displays With Porous Fluid Barriers," U.S. Appl. No. 61/234,099 (2009), 39 pp.

Heikenfeld, "Bistable Grayscale Electrofluidic Displays," U.S. Appl. No. 61/234,070 (2009), 42 pp.

Heikenfeld, et al., "Agile Lab-On-A-Chip Enabled by Virtual Electrowetting Channels," U.S. Appl. No. 61/300,549 (2010), 31 pp.

Heikenfeld, "Bi-Primary Color System for Electronic Paper," U.S. Appl. No. 61/307,637 (2010), 42 pp.

Heikenfeld, "Porous Electrofluidic Barriers," U.S. Appl. No. 61/308,105 (2010), 48 pp.

Heikenfeld, "Display Capable Electrowetting Light Valve," U.S. Appl. No. 61/308,020 (2010), 34 pp.

Heikenfeld, "Color-Mixing Bi-Primary Color Systems for Displays," U.S. Appl. No. 61/379,578 (2010), 17 pp.

Heikenfeld, et al., "Color-Mixing Bi-Primary Color Systems for Displays," International Application No. PCT/US2011/050169 (2011), 25 pp.

Heikenfeld, et al., "Fast, Bistable, and 100% White Area Display Device, and Methods for Making and Operating Such Display Devices," U.S. Appl. No. 61/160,113 (2009), 36 pp.

Steckl et al., "Electronics Based Upon Liquid Logic," U.S. Appl. No. 60/573,662 (2004), 16 pp.

Heikenfeld et al., "High Speed Electrowetting Light Valve," U.S. Appl. No. 60/586,555 (2004), 32 pp.

Heikenfeld et al., "Sonofluidic device," U.S. Appl. No. 60/725,718 (2005), 8 pp.

* cited by examiner

ELECTROFLUIDIC IMAGING FILM, DEVICES, AND DISPLAYS, AND METHODS OF MAKING AND USING THE SAME

CROSS-REFERENCE TO RELATED APPLICATIONS

This application claims the benefit of U.S. Provisional Application No. 61/388,272, filed Sep. 30, 2010, the disclosure of which is hereby incorporated by reference herein in its entirety.

STATEMENT REGARDING FEDERALLY SPONSORED RESEARCH OR DEVELOPMENT

The U.S. Government has a paid-up license in this invention and the right, in limited circumstances, to require the patent owner to license others on reasonable terms as provided for by the terms of Grant No. 0640964 awarded by the National Science Foundation and Grant No. W911NF-09-2-0034 awarded by the U.S. Army Research Labs.

BACKGROUND

Conventional electrofluidic displays are capable of transposing one or more colored fluids through microfluidic cavities using electrowetting control. The technology is capable of higher brightness and improved color saturation as compared to some electrowetting or electrophoretic displays. Unlike electrophoretic displays, where exact pixel and structure alignment is not needed for pixel operation, electrofluidic displays required highly precise alignment of control electrodes of two adjacent pixels to ensure separation of the fluids. If the fluids from adjacent pixels join, then it may be difficult and unpredictable to split the fluids and to return the fluid to the respective pixel. Un-even splitting of the fluids will cause excess fluid to build up in some pixels and reduce the optical performance of the display. In some cases, un-even fluid splitting may continue until display operation is no longer possible. Furthermore, when features are formed around the border of adjacent pixels to keep the fluids of the adjacent pixels separated, these features take up visible space and reduce the optical performance of the display.

What is needed is an advanced electrofluidic imaging film or device suited to repeated operation over any arrangement of electrodes. Such display technology would be less expensive to manufacture, capable of higher in maximum resolution, faster in switching speed, possibly more reliable, and would allow higher optical performance. Furthermore, an electrofluidic imaging film or device is needed that provides imaging or information display without the optical losses associated with pixel border features.

SUMMARY OF THE PRESENT INVENTION

The present invention relates to electrofluidic imaging films, or devices, that overcome the issues with conventional devices by reducing or eliminating the need for precise electrode alignment to a particular pixel, allowing for simple fabrication methods, and providing imaging or information display without the optical losses associated with pixel border features.

In accordance with an embodiment of the present invention, a device includes first and second substrates that are spaced to define a fluid space. Polar and non-polar fluids occupy the fluid space. A first electrode, with a dielectric, is positioned on the first substrate and electrically coupled to at least one voltage source, which is configured to supply an electrical bias to the first electrode. The fluid space includes at least one fluid splitting structure that is configured to facilitate the movement of the non-polar fluid into a portion of the polar fluid. Fluid splitting structure assisted movement of the non-polar fluid splits the polar fluid.

According to another embodiment of the present invention, a display device includes first and second substrates that are spaced to define a fluid space. Polar and non-polar fluids occupy the fluid space. A third substrate is positioned between, and is spaced away from, the first and second substrates to form first and second channels within the fluid space. The third substrate includes two pluralities of pores: a first plurality of pores is porous to the polar fluid and a second plurality of pores is porous to the non-polar fluid. A first electrically-insulated electrode is positioned in the first channel and a second electrically-insulated electrode is positioned in second channel. At least one voltage source is configured to apply an electrical bias to at least one of the electrically-insulated electrodes. The electrical bias causes the polar fluid to move within the fluid space and with respect to the first and second channels. The fluid space further includes at least one fluid splitting structure that is configured to facilitate the movement of the non-polar fluid into a portion of the polar fluid. Fluid splitting structure assisted movement of the non-polar fluid splits the polar fluid.

Still another embodiment of the present invention is directed to a device having first and second substrates that are spaced to define a fluid space. Polar and non-polar fluids occupy the fluid space. A third substrate is positioned between, and is spaced away from, the first and second substrates to form first and second channels within the fluid space. The third substrate includes a first plurality of pores that is porous to the polar fluid and a second plurality of pores that is porous to the non-polar fluid. A first electrically-insulated electrode is positioned in the first channel and a second electrically-insulated electrode is positioned in second channel. At least one voltage source is configured to apply an electrical bias to at least one of the electrically-insulated electrodes. The electrical bias causes the polar fluid to move within the fluid space and with respect to the first and second channels. The fluid space includes at least one fluid splitting structure that is configured to facilitate the movement of the non-polar fluid into a portion of the polar fluid. Fluid splitting structure assisted movement of the non-polar fluid splits the polar fluid. The polar fluid may also move, separately, through at least two of the first plurality of pores and merge in at least one of the first and second channels.

In one embodiment of the present invention, a method of fabricating a display pixel includes fabricating first and second electrodes on first and second substrates, respectively. A film is positioned between the first and second electrodes on the first and second substrates and the substrates are secured to create a fluid space. First and second fluids are dosed into different portions of the fluid space. The film is porous to at least one of the first and second fluids. At least one spacer is located within the fluid space to support the film and to also facilitate movement of the first fluid in a manner that causes the second fluid to split.

In another embodiment of the invention, a method of operating a display pixel is described. The display pixel includes a first substrate, a second substrate, a fluid space between the first and second substrates, and at least one spacer positioned within the fluid space. A polar fluid occupies at least a portion of the fluid space, and a non-polar fluid occupies a portion of the fluid space that is not otherwise occupied. The method of operation includes directing the polar fluid to surround the at least one spacer. The first polar has a first radius of curvature at the at least one spacer and has a second radius of curvature at a position that is spaced away from the first radius of curvature. When a biasing energy is applied to an electrode, which is electrically coupled to the polar fluid, the second radius of curvature increases. Increasing the second radius of curvature moves the non-polar fluid through the at least one spacer and into the polar fluid. The movement of the non-polar fluid and the first radius of curvature of the polar fluid cause the polar fluid to split into at least two volumes.

BRIEF DESCRIPTION OF THE DRAWINGS

The accompanying drawings, which are incorporated in and constitute a part of this specification, illustrate embodiments of the invention and, together with a general description of the present invention given above and the detailed description given below, serve to explain the principles of the present invention.

DETAILED DESCRIPTION

Figure 1A:
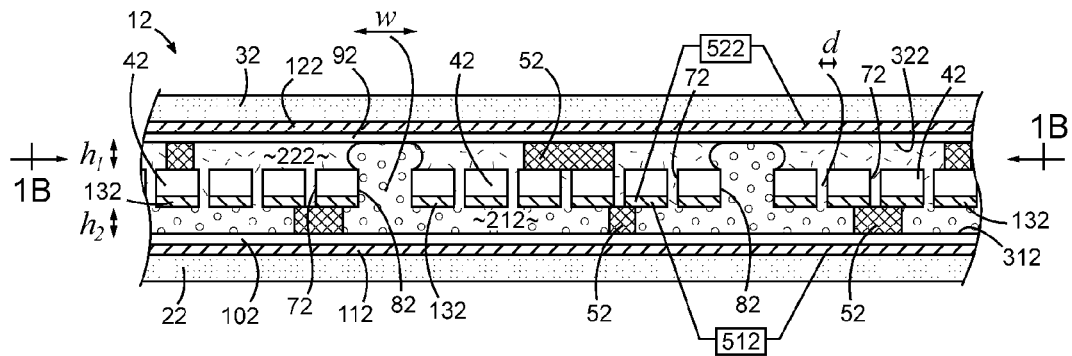
FIG. 1A is a cross-sectional view through a display device in accordance with one embodiment of the present invention, shown in a first visual state.

Although the present invention will be described in connection with certain embodiments, the description of the one or more embodiments is not intended to cover all alternatives, modifications, and equivalent arrangements as may be included within the spirit of the present invention. In particular, those of ordinary skill in the art will recognize that the components of the various electrofluidic devices described herein may be arranged in multiple different ways.

One or more embodiments of the present invention include an electromechanical force on a conductive polar fluid that is adjacent to an electrically-insulated electrode. The electromechanical force originates near a line of contact between the conductive polar fluid and a dielectric layer that insulates the electrode. The electromechanical force is proportional to electrical capacitance times the square of a bias potential, or applied voltage. The electromechanical force is generally oriented such that it is directed outward from an exposed surface of the polar fluid. When the polar fluid is confined within a cavity or channel, the electromechanical force may be interpreted as a force per unit area or a pressure. Movement of fluid by the electromechanical force provides high-speed operation (on the order of milliseconds), low power capacitive operation (about 10 mJ/m$^2$), and excellent reversibility.

Other embodiments of the present invention may operate in accordance with alternative methods of moving fluids that are well-known by those of ordinary skill in the art of microfluidics. These alternate methods may include, but are not limited to, electrowetting without insulators, syringe-pumps, thermocapillary, photo-responsive molecules (such as spiropyrans), dielectrophoresis, electrophoresis, magnetic and electromagnetic forces, and micro-electro-mechanical pumping.

A Cartesian coordinate system may be used to define specific directions and orientations. References to terms such as "above," "upper," "below," and "lower" are for convenience of description only and represent only one possible frame of reference for describing a particular embodiment. The dimensions of the devices described herein may cover a wide range of sizes, from nanometers-to-meters, based on the particular use. Terms such as visible may be used in some cases to describe a person or machine vision system or other optical source or detector that is facing towards a particular surface of the device and that is capable of perceiving light emitted from the device and/or color system described herein.

Unless otherwise noted, the terms concave and convex refer to the geometry associated with the smallest radius of curvature along an exposed meniscus of the fluid. It is understood that other larger radii of curvatures on a meniscus may be oppositely concave or convex but will exhibit a weaker influence on the Laplace pressure of the meniscus. These additional radii are often not shown in the figures, but are readily understood in terms of their weaker influence on device design and operation.

The devices described in accordance with one or more embodiments of the present invention may also be useful for reflective, transmissive, and transflective displays. Therefore, light may transmit through or reflect from one or more surfaces of the devices. The devices may operate in a dual mode, i.e., transmissive and reflective at the same time, or switch between such modes of operation on demand. Backlights or other light sources may be incorporated and are also fully compatible with the devices described in accordance with one or more embodiments of the present invention herein. Light may be provided by a source that is positioned internal to the device, such as a backlight or a frontlight, by a waveguide or other optics, or by the ambient surroundings such as sunlight or conventional light fixtures. Any means of coupling a light source is applicable, including all techniques known by those skilled in the art of displays.

Figure 1B:
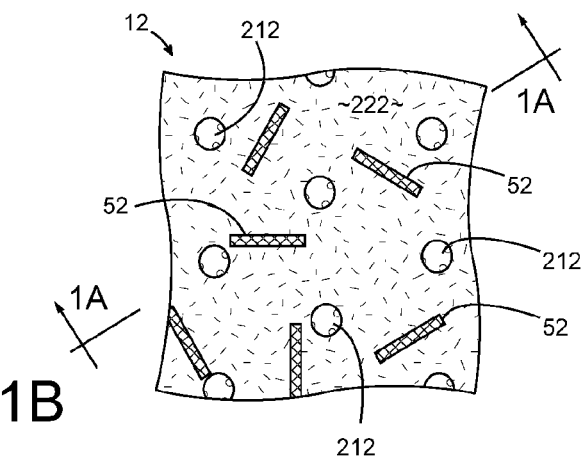
FIG. 1B is a top view of the display device of FIG. 1A taken along the line 1B-1B in FIG. 1A.

Turning now to the figures, and in particular to FIGS. 1A and 1B, a device 12 is constructed in accordance with one embodiment of the present invention. The device 12 includes a first substrate 22 and carries a first electrode 112, which is coated with an electrically-insulating dielectric layer 102.

The display 12 further includes a second substrate 32 with a second electrode 122, which may also include a dielectric layer 92.

The first and second substrates 22, 32 may be constructed from glass, plastic, metal foils, paper, textiles, sponges, or a variety of other materials that support construction of the device 12. The first and second electrodes 112, 122, as well as other electrodes as provided herein, may be constructed from a transparent solid material, such as indium oxide tin oxide ($In_2O_3$:$SnO_2$); a polymer, such as poly(3,4-ethylenedioxythiophene) poly(styrenesulfonate) (PEDOT:PSS); a reflective solid material, such as aluminum (Al); or a colored solid material, such as carbon black, so long as the electrode material provides suitable electrical conductance. Electrodes may alternatively be composites such as silver (Ag) nano-wires in conducting polymer (e.g. Cambrios CLEAR-OHM conductive film (Sunnyvale, Calif.)).

The dielectrics layers 102, 92 may include any solid material which provides suitable electrical insulation. The dielectric layers 102, 92 may comprise an inorganic material, such as silicon nitride ($Si_3N_4$); an organic material, such as Parylene C; or a fluorinated material, such as Parylene F or HT; or mixtures, layers, and/or combinations thereof. The dielectric layers 102, 92 may have a thickness that ranges from about 1 nm to several 10s μm, resulting in operating voltages that range from between about 1 V and about 120 V, respectively. In some embodiments, no dielectric layer is required (commonly referred to as electrocapillarity). Solid surfaces or films may be inherently hydrophobic, or provided with an order of hydrophobicity by addition of a film or coating by plasma treatment, molecular mono-layer treatment, or other means. Fluoropolymers, such as Fluoropel (Cytonix, Beltsville, Md.) and Cytop (Asahi, Chiyoda-ku, Tokyo), provide exemplary hydrophobicity. Additional solid materials, such as polyimide, which are not hydrophobic to polar fluids (such as water in a gas) may still be hydrophobic if the gas is replaced with a non-polar fluid having a surface tension that is similar to the solid material.

Generally, the term hydrophobic is used herein to describe a Young's wetting angle of greater than about 90 degrees, and the term hydrophilic is used herein to describe a Young's wetting angle of less than about 90 degrees. However, hydrophobic or hydrophilic functionality may extend beyond these limits in certain devices or material configurations. Super hydrophobic coatings are those exhibiting a large Young's angle for a polar liquid in a gas and are achieved by geometrically texturing a surface.

Returning again to FIGS. 1A and 1B, the display 12 includes a film 42 that includes at least a plurality of pores 72, 82. The term pore, via, or duct may be generally used herein to describe a pathway for fluid flow. The film 42 may be constructed of a polymer like polycarbonate or polyethyleneterephthalate.

The film 42 includes a third electrode 132, which may be constructed in a manner that is similar to the first and second electrodes 112, 122 described above. In some embodiments, the film 42 and the third electrode 132 may comprise, at least partially, a diffuse white reflective sheet. In other embodiments, the film 42 is optically scattering and/or the third electrode 132 has a non-planar texture. Suitable scattering materials may include polymers or fluids having particles disperse therein, wherein the particles differ in refractive index from the polymer or fluid. Scattering materials may include structured polymers or metals, microreplicated optics, holographic films, wavy or rough electrodes, or other optically scattering or diffusing features that are known by those skilled in the art of optics and displays.

The film 42 is located between, and spaced away from, the first and second substrates 22, 32. The spaces formed between the film 42 and the first substrate 22 and the second substrate 32 are referred to as a first channel 312 and a second channel 322, respectively. Each of the first and second channels 312, 322 have a respective height, $h_1$, and $h_2$, which may be set by one or more spacers 52. The spacers 52 may be made of solid materials that are similar to the solid materials used in constructing the substrates 22, 32. In some embodiments, the spacers 52 may be formed as a part of the substrate 22, 32, such spacers 52 being formed by etching, laser processing, microreplication, or other suitable technique. The spacers 52 may also be formed from optically curable epoxies or photoresists, such as MICROCHEM SU-8 photoresist (Microchem Corp. Newton, Mass.) or DUPONT Per-MX (E. I. du Pont de Nemours and Co., Wilmington, Del.). The spacers 52 do not always need to span the entire channel height 312, 322. In some cases the spacers 52 may only span a portion of the height such that fluids may occupy a space between the spacers 52 and the substrates 22, 32 for increased viewing of the fluids (i.e., increased optical performance).

The term channel or hydrophobic channel, as provided herein, may be used to describe physical confinement of a fluid that has a horizontal dimension than it is greater than a vertical dimension, and which, in some embodiments of the present invention, may include a manner by which to visibly display the fluid therein. The channel is generally defined or bounded by one or more walls, typically of a fabricated patterned substrate or film.

Comparatively, a reservoir may be any feature formed as part of a device, or is external to the device, including any feature that may store or hold a fluid until it is ready to be moved within, or into, a device. Reservoirs may also be simple inlet/outlet ports or vias that may or may not be connected to additional devices, chambers, or channels.

Because the spacers 52 occupy only a small visible area of the second channel 322, and if a non-polar fluid contained therein is optically clear, then the visual appearance of the second channel 322 is dominated by the film 42 or the color of the fluid residing within the second channel 322.

Referring still to FIG. 1A, a first voltage source 512 electrically couples the first and third electrodes 112, 132, and a second voltage source 522 electrically couples the second and third electrodes 122, 132. The voltage sources 512, 522 may be direct voltage sources from a power source or a locally generated voltage or current sources, such as thin-film transistors. The voltage sources 512, 522 may provide control through segmented, passive matrix, and active matrix addressing schemes. The voltage sources 512, 522 may be biased by 0 V, a positive DC voltage, a negative DC voltage, AC voltage, or combinations thereof as appropriate. Numerous direct, alternating, or other types of voltage sources are known to those skilled in the art of displays or microfluidics, and are applicable.

The device 12 contains both a polar fluid 212, which may be a pigment dispersion of carbon black in propylene glycol with viscosity reducing co-solvents, and a clear non-polar fluid 222, which may be an oil, such as an alkane or a silicone. The term fluid may be used to describe any material or combination of materials, such as a liquid or a dispersion, that moves freely according to the principles of the present invention. The fluids may include, for example, liquids, gases, and some solid materials (such as liquid powders), and are not confined to any particular composition, viscosity, or surface tension. The fluids may also contain any weight percent of a solid material so long as that solid material is stably dispersed in the fluid, or in the case of dyes, dissolved in the fluid. The fluids may also contain mixtures of multiple fluids, dispersants, resins, biocides, and other additives used in commercial fluids with demanding optical, temperature, electrical, fouling, or other performance specifications.

Examples of the polar fluid 212 may include, but are not limited to, water, propylene glycol, formamide, ionic fluids, and possibly even liquid metals. Examples of the non-polar fluid 222 include, but are not limited to, alkanes and silicone oils, such as DOW-CORNING OS-20 (Dow-Corning Corp., Midland, Mich.). Examples of fluid gases may include, but are not limited to, argon, carbon dioxide, and nitrogen. In some cases the non-polar fluid 222 may be replaced by a gas.

Pigments and dyes in many cases may be solid particles that are dispersed or dissolved in the fluid to alter at least one optical or spectral property of the fluid.

Figure 1C:
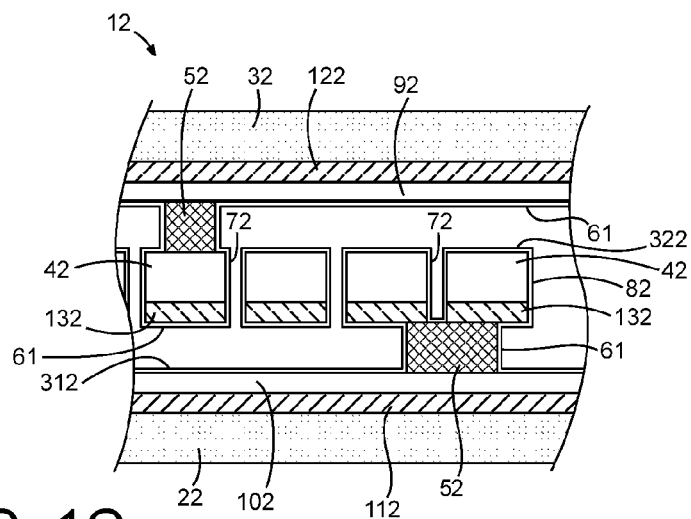
FIG. 1C is an enlarged view of a portion of the display device of FIG. 1A.

In some embodiments, such as is shown in FIG. 1C, the surfaces surrounding the first and second channels 312, 322 may include a thin hydrophobic polymer coating 61 that provides a Young's angle ("$\theta_Y$") ranging from about 90 degrees to about 180 degrees, and preferably 180 degrees, for the polar fluid 212 in the presence of the non-polar fluid 222. Typical hydrophobic fluoropolymer coatings may be less than approximately 100 nm thick and, when placed over the electrode 132, the hydrophobic coating 61 should be sufficiently thin and not electrically-insulating. Said another way, the thickness of the hydrophobic coating 61 does not resist electrical conduction between the polar fluid 212 and the adjacent electrode 132.

As a first approximation, a voltage applied by the voltage sources 512, 522 to a select pair of the electrodes 112, 122, 132, causes an electrowetting effect that reduces the contact angle of the polar fluid 212 to a value of $\theta V$, and may be predicted according to:

$$\cos\theta V = \frac{(\gamma_{od} - \gamma_{pd})}{\gamma_{po}} + \frac{CV^2}{2\gamma_{po}}$$

where C is capacitance per unit area of the dielectrics 102, 92; $\gamma$ is the interfacial surface tension between the polar fluid 212 ("p"), the non-polar fluid 222 ("o"), and the dielectric layer 102, 92 ("d"); and V is the applied DC voltage or AC RMS voltage applied to the selected pair of the electrodes 112, 122, 132 by the voltage sources 512, 522. The term $\gamma_{od}-\gamma_{pd}/\gamma_{po}$ is the same as the cosine of $\theta_Y$. At the micro-scale, the Young's angle is unchanged during electrowetting; however, at the macro-scale, the Young's angle appears to change. For the sake of simplicity in diagramming herein, the $\theta V$ will be drawn without such consideration for the microscopic $\theta_Y$. A large $\theta_Y$ value causes a particular channel 312, 322 and/or the plurality of pores 72, 82 to impart a Laplace pressure on the polar fluid 212 and according to:

$$\Delta p = \gamma_{po}\left(\frac{1}{R_1} + \frac{1}{R_2}\right)$$

which includes the horizontal and vertical principle radii of curvature ($R_1$, $R_2$) for the menisci of the polar fluid 212 in contact with the particular channel 312, 322 and/or the plurality of pores 72, 82. Generally, and for the illustrative device 12, in accordance with the embodiments of the present invention, $h_1$ and $h_2$, are smaller than a horizontal width (not shown) of the respective channel 312, 322. Therefore, the change in the Laplace pressure for the polar fluid 212 meniscus is due mainly to the vertical radius of curvature, $R_2$. When $\theta_Y$ is 180 degrees, $R_2$ is half the height of the particular channel 312, 322. By electrowetting the surface of the particular channel 312, 322, such that $\theta V$ is approximately 90 degrees, $R_2$ would double and the Laplace pressure $\Delta p$ is decreased by a factor of two. As applied to the present embodiment, applying a voltage to a pair of the electrodes 121, 122,132 creates a pressure imbalance and moves the polar fluid 212 within the particular channel 312, 322. Further description of electrowetting operation is provided in S. YANG, et al., "High reflectivity electrofluidic pixels with zero-power grayscale operation," *Appl. Phys. Lett.* 97(14): 143501-1 to 143501-3 (2010).

In use, and as shown in FIGS. 1A and 1B, the display 12 is shown with no voltage applied by either voltage source 512, 522. The polar fluid 212 fills the first channel 312. The Laplace pressure for the polar fluid 212 within the first channel 312 is proportional to $1/h_2$. The polar fluid 212 also fills the first plurality of pores 82 of the film 42, wherein each of the pores 82 has a width, w, that is significantly greater than either of $h_1$ and $h_2$. As a result, the polar fluid 212 is always in contact with the dielectric layers 102, 92 on the first and second substrates 22, 32, respectively. When each of the first plurality of pores 82 is cylindrical, $\Delta p$ is proportional to $2/w$. Ideally, w is greater than $2h_1$ and $2h_2$, and preferably greater than $3h_1$ and $3h_2$. Distinct from the first plurality of pores 82, the second plurality of pores 72 generally should have width (not labeled) small enough such that polar fluid 212 never wets into the second plurality of pores 72. This is achieved by having a width for the plurality of pores 72 that is ideally less than $2h_1$ and $2h_2$, and preferably less than $h_1$ and $h_2$. While the polar fluid 212 will generally move into those spaces that impart a low Laplace pressure, contact angle hysteresis may increase the pressure difference necessary to move the polar fluid 212.

It would be readily understood that the terms diameter and width should not be interpreted as limiting the geometry of the various plurality of pores 72, 82. Rather, any geometry, regular and irregular, may be used so long as the geometry satisfies the Laplace pressure conditions provided. In fact, the contact angle of the polar fluid 212 within each of first and second pluralities of pores 82, 72 could be different to achieve the same result for the Laplace pressure. For example, the first plurality of pores 82 may be shaped such that w is less than either of $2h_1$ and $2h_2$ if those pores are suitably hydrophilic.

Figure 1D:
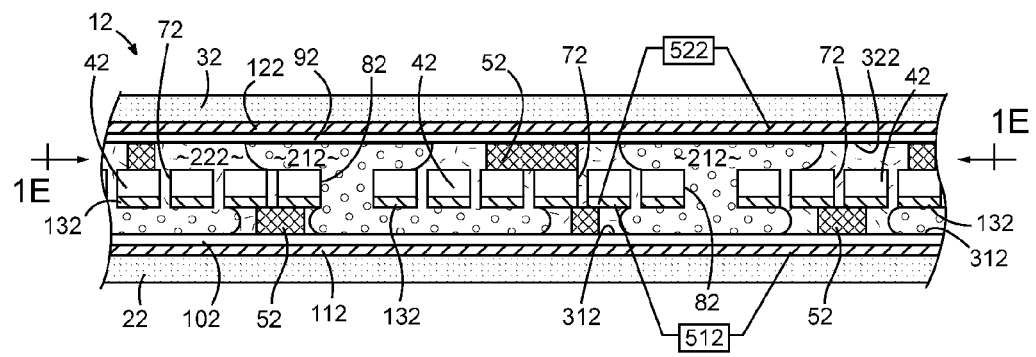
FIG. 1D is a cross-sectional view through the display device of FIG. 1A, shown in a second visual state.
Figure 1E:
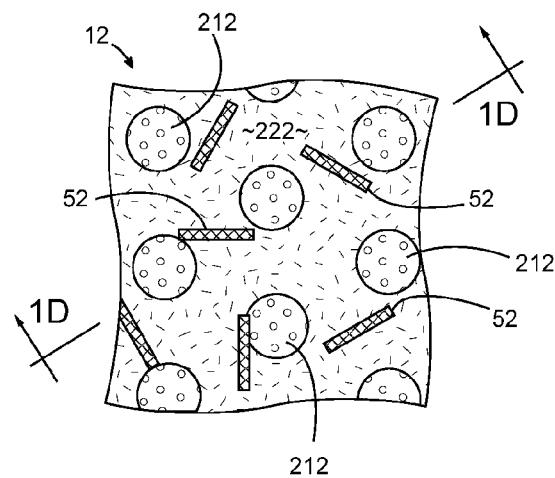
FIG. 1E is a top view of the device of FIG. 1D taken along the line 1E-1E in FIG. 1D.

With reference now to FIGS. 1D-1E, the display 12 has a voltage applied by voltage source 522 to the second electrode 122 and the third electrode 132. As shown, the third electrode 132 is electrically-conductive with the polar fluid 212 and the second electrode 122 is electrically-insulated from the polar fluid 212 by the dielectric 92. Therefore an electromechanical force is created that lowers the Laplace pressure within the second channel 322 between the film 42 and the second substrate 32. Reducing the Laplace pressure within the second channel 322 is observable in FIG. 1D as a larger vertical radius of curvature for the meniscus of the polar fluid 212 in the second channel 322 as compared to the smaller vertical radius of curvature for the meniscus of the polar fluid 212 in the first channel 312, where no voltage is applied to first electrode 112. This imbalance in the Laplace pressure causes the polar fluid 212 to move into the second channel 322 through the first plurality of pores 82 in the film 42, and the non-polar fluid 222 to move into the first channel 312 through the second plurality of pores 72 in the film 42. FIGS. 1D and 1E illustrate a state of the display 12 during fluid movement and are not representative of a state of equilibrium. In order for the polar fluid 212 to move from the state of FIG. 1A to the state of FIG. 1D, the first channel 312 may include splitting the polar fluid 212 at the spacers 52 positioned proximate the second plurality of pores 72 in the film 42, which is described in greater detail below.

Figure 1F:
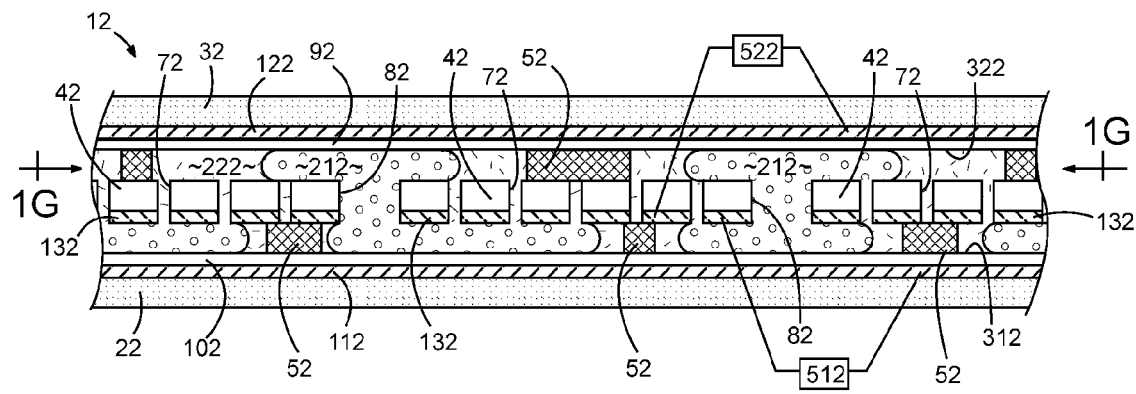
FIG. 1F is a cross-sectional view through the display device of FIG. 1A, shown in a third visual state.
Figure 1G:
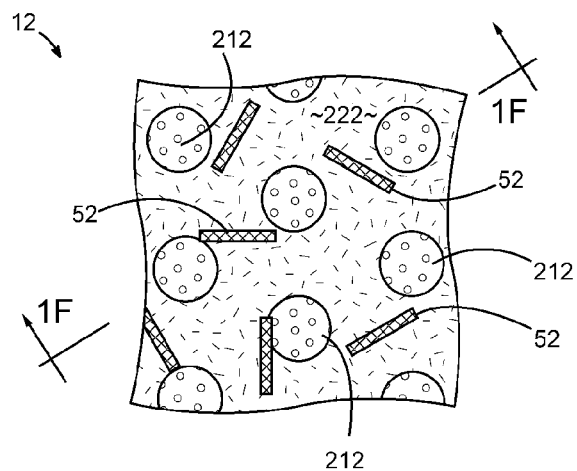
FIG. 1G is a top view of the device of FIG. 1F taken along the line 1G-1G in FIG. 1F.

With reference now to FIGS. 1F-1G, the display 12 is shown with no voltage applied by either voltage source 512, 522. As a result, the Laplace pressure acting on the polar fluid 212 is approximately equal in both channels 312, 322 and the polar fluid 212 remains stable in an intermediate "grayscale" position partially between filling the first and second channels 312, 322. However, maintaining the intermediate position requires some amount of contact angle hysteresis or other type of wetting hysteresis, because the Laplace pressures in each channel 312, 322 will never be completely equal in practice.

Stable positioning of the polar fluid 212 in the intermediate position may alternatively be achieved if the voltage sources 512, 522 apply voltages that result in similar electromechanical pressures in the channels 312, 322.

Figure 1H:
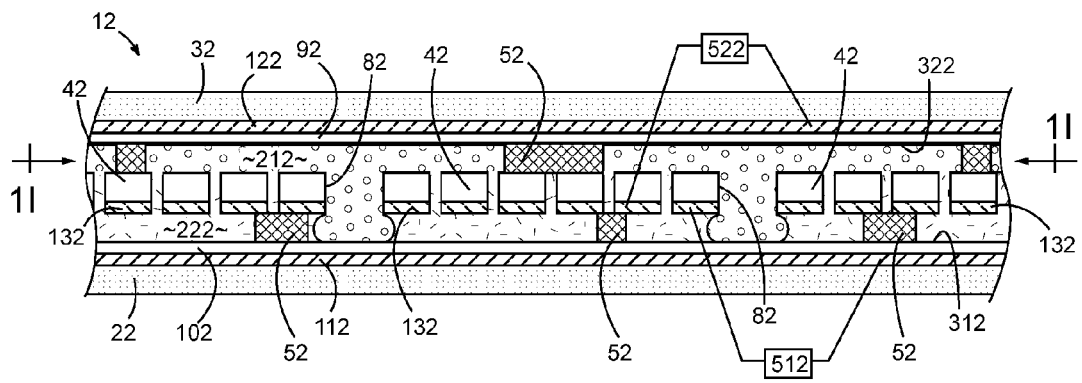
FIG. 1H is a cross-sectional view through the display device of FIG. 1A, shown in a fourth visual state.
Figure 1I:
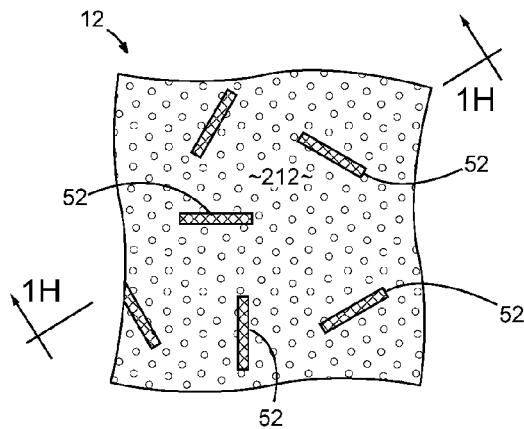
FIG. 1I is a top view of the device of FIG. 1H taken along the line 1I-1I in FIG. 1H.

With reference to FIGS. 1H and 1I, the display 12 is shown after a voltage is applied by the voltage source 522, for a time, to cause the polar fluid 212 to nearly or completely fill the second channel 322. The polar fluid 212 is stable in this position without continued-applied voltage.

Figure 1J:
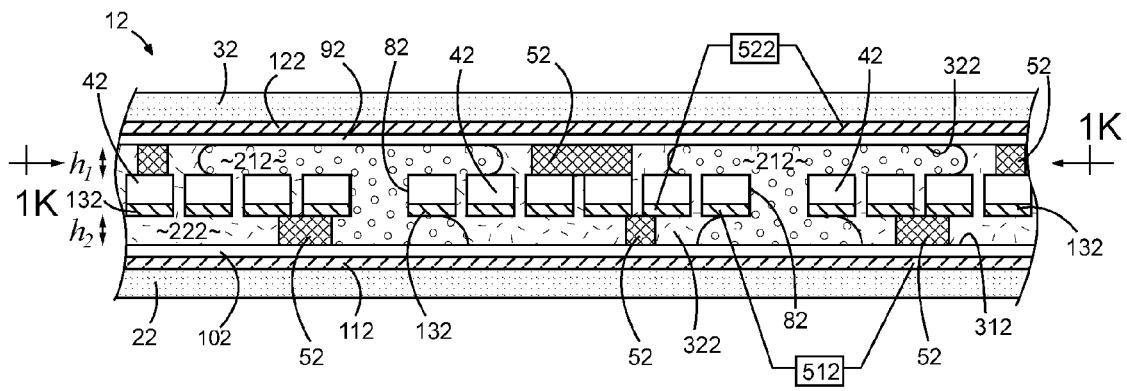
FIG. 1J is a cross-sectional view through the display device of FIG. 1A, shown in a fifth visual state.
Figure 1K:
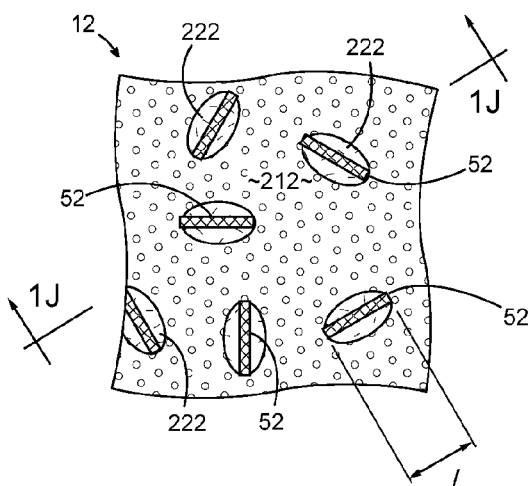
FIG. 1K is a top view of the device of FIG. 1J taken along the line 1K-1K in FIG. 1J.

Turning now to FIGS. 1J-1K, the electrofluidic device 12 is shown with a voltage applied by the voltage source 512 to the first electrode 112 and third electrode 132. The third electrode 132 is electrically-conductive with the polar fluid 212 while the first electrode 112 is electrically-insulated from the polar fluid 212 by the dielectric layer 102. Therefore an electromechanical force is created that lowers the Laplace pressure in the first channel 312 and that causes the polar fluid 212 to move into the first channel 312.

Because the polar fluid 212 fully occupies the second channel 322 in FIG. 1H, introducing the non-polar fluid 222 into the second channel 322 to cause the polar fluid 212 to leave the second channel 322 would conventionally be difficult. However, the device 12 introduces the non-polar fluid 222 into the second channel 322 through the second plurality of pores 72 of the film 42. Thus, the non-polar fluid 222 splits the polar fluid 212 as the polar fluid 212 retracts from the second channel 322 and enters the first channel 312. In other words, the surface tension of the polar fluid 212 resists fluid splitting and the related fluid surface area increases in the second channel 322. Therefore, the non-polar fluid 222 is directed through the second plurality of pores 72 to initiate a splitting of the polar fluid 212. After an initial splitting, the polar fluid 212 may be further split, retracted from the second channel 322, and enter the first channel 312. It will be appreciated by those of ordinary skill in the art that splitting the polar fluid 212 should not create a localized increase in the Laplace pressure at the spacers 52, which would create an energetic barrier to splitting.

Returning again to the illustrated embodiment, the spacers 52 may be constructed to have at least one surface that imparts a large radius of curvature along at least one dimension of the polar fluid 212 meniscus. For example, as specifically shown in FIG. 1K, the spacer 52 may have a length, l, that is much larger than the first channel height, $h_2$. As a result, the non-polar fluid 222 is easily introduced between the spacer 52 and the polar fluid 212. While the spacer 52 does change the horizontal radius of curvature for the meniscus of the polar fluid 212, the horizontal radius of curvature is already large due to the length, l, of the splitting spacer 52. A large, horizontal radius of curvature implies a weak contribution to the Laplace pressure. Thus, for the display 12 shown in FIGS. 1A-1K, the large, horizontal radius of curvature at the spacers 52 and the contributions due to the Laplace pressure of the polar fluid 212 are weaker than the vertical radii of curvature and relative Laplace pressures of the polar fluid 212 in the first and second channels 312, 322. It would be readily appreciated that the spacers 52 are only one example of a fluid splitting structure, and that other fluid splitting structures are possible so long as the structure operate by, and satisfy, the principles of the present invention.

If the voltage continues to be applied after the polar fluid 212 is split, then the display 12 will return the state shown in FIGS. 1A and 1B, i.e., wherein the polar fluid 212 is primarily located within the first channel 312. Conversely, the spacer 52 may also be helpful in moving the polar fluid 212 from the first channel 312 to the second channel 322, which was shown in FIGS. 1D and 1E.

In this way, the spacer 52 is useful in devices in which the polar fluid 212 resides fully within one of the first and second channels 312, 322, both of which provide maximum optical performance and contrast. Yet, the spacer 52 may not be necessary in maintaining or operating in intermediate filling states of the first and second channels 312, 322 because the polar fluid 212 may already be sufficiently split when in the intermediate state.

Referring still to FIGS. 1A-1K, the spacer 52 may have any geometry that allows the polar fluid 212 to surround at least one dimension of the spacer 52 and that facilitates non-polar fluid splitting of the polar fluid 212.

In various other embodiments, the spacers 52 may also provide, additionally or alternatively, other functions. For example, if the film 42 and the third electrode 132 allow optical transmission near the spacer 52, and if the spacer 52, itself, is optically transmissive, then the device 12 may be used in both optically transmissive and reflective modes. In alternate embodiments, a first set of spacers 52 may completely surround a portion of the channels 312, 322 of the device 12 providing always separated volumes of polar fluid 212, while a second set of spacers 52 are instead surrounded by polar fluid 212 in the channels 312, 322 such that they provide splitting of polar fluid 212.

Figure 2A:
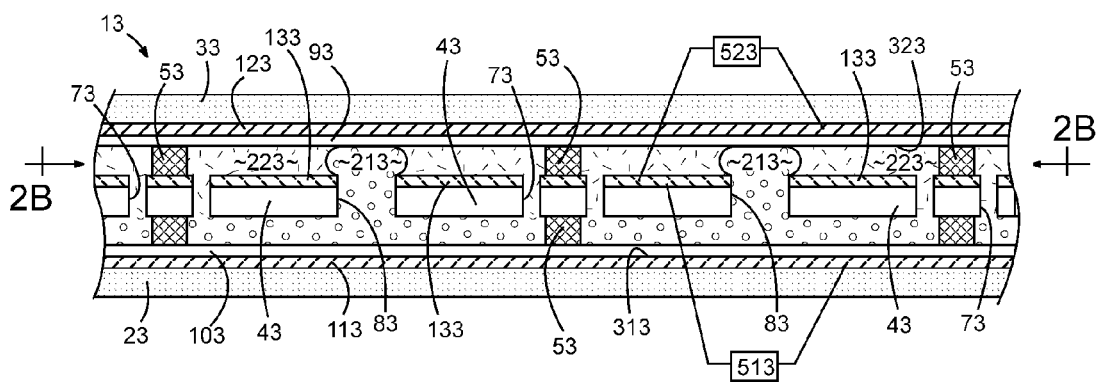
FIG. 2A is a cross-section view through a display device in accordance with another embodiment of the present invention.
Figure 2B:
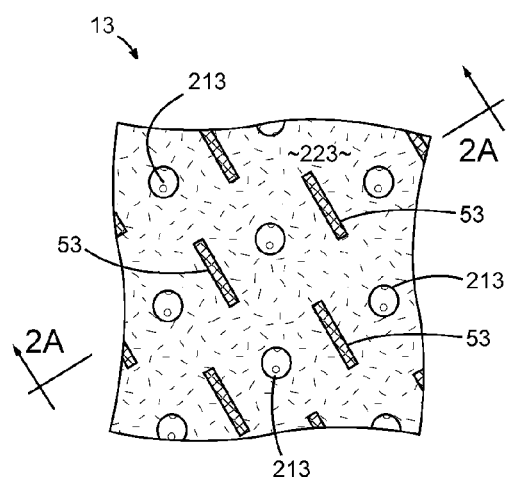
FIG. 2B is a top view of the display device of FIG. 2A, taken along the line 2B-2B in FIG. 2A.

Referring now to FIGS. 2A and 2B, a device 13 in accordance with another embodiment of the present invention is shown. The device 13 includes a first substrate 23 with a first electrode 113 and first dielectric 103, a second substrate 33 with a second electrode 123 and second dielectric 93, a film 43 and a third electrode 133 located between and spaced away from the first and second substrates 23, 33, and a plurality of spacers 53. The film 43 includes first and second pluralities of pores 73, 83 therein, and the pores 73, 83, are positioned in a specific or regular geometric pattern. An optimized a regular geometry of the plurality of spacers 53, aligned with a geometrical pattern of the pores 73, may further improve the polar fluid 212 splitting performance as well as other performance features of the device 13.

The particular embodiment of FIGS. 2A and 2B illustrates the third electrode 133 being positioned on a second channel side of the film 43. If the film 43 and third electrode 133 are constructed to be optically specular in appearance, then the requisite scattering of light reflection may be achieved by including a diffuse pigment dispersion in the polar fluid 213 or by texturing of the third electrode 133.

Additionally, it will be noted that the plurality of the spacers 53 in FIG. 2A are aligned and fully support the film 43, whereas the spacers 52 in FIG. 1A were not aligned. That is, the splitting spacers 52 of FIG. 1A were randomly located, such that spacers 52 will overlap and support the film 42.

Figure 3A:
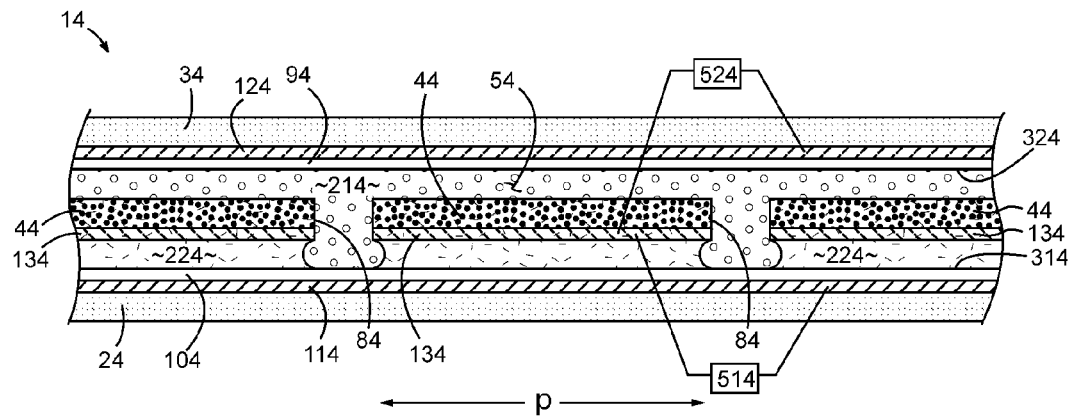
FIG. 3A is a cross-section view through a display device in accordance with still another embodiment of the present invention, shown in a first visual state.
Figure 3B:
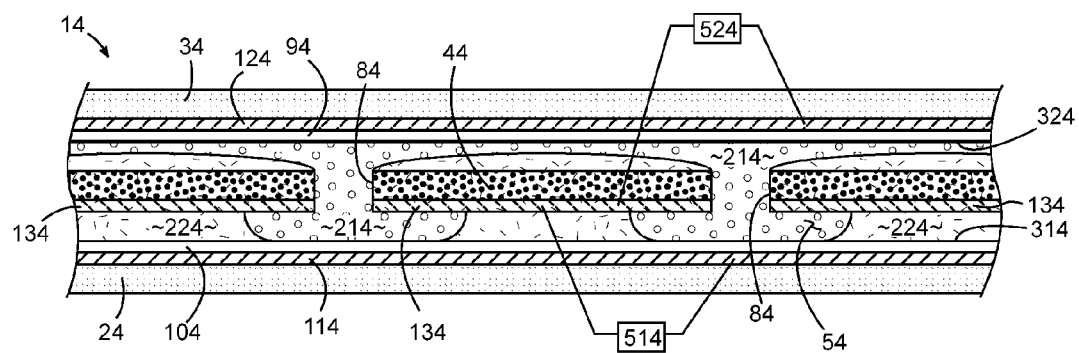
FIG. 3B is a cross-sectional view through the display device of FIG. 3A, shown in a second visual state.

A device 14 in accordance with another embodiment of the present invention is shown and described with reference to FIGS. 3A-3B. The device 14 includes a first substrate 24 with a first electrode 114 and first dielectric 104, a second substrate 34 with a second electrode 124 and second dielectric 94, a film 44 with a third electrode 134, and the film 44 is located between and spaced away from the first and second substrates 24, 34. The film 44 is uniformly porous to the non-polar fluid 224. The film 44 may be a textile, a filter paper, or other suitably porous material. As shown in FIG. 3B, application of a voltage by a voltage source 514 causes the polar fluid 214 to move into the first channel 314 as the non-polar fluid 224 moves vertically through the film 44, toward the second substrate 34, and splits the polar fluid 214. Therefore the film 44 acts as a fluid splitting structure in a manner similar to spacers 52, 53 of FIGS. 1A and 2A. The dimension of the channels 314, 324 between pores 84 of the film 44 is large enough to impart splitting in a manner as described above. Generally, this requires that flow of the polar fluid 214 in the channels 314, 324 be slowed by drag or other forces, else such splitting would not be possible. Generally, the mechanism of splitting the polar fluid 214 in the device 14 would be slower than that achieved for device 12 of FIG. 1A, and the device 13 of FIG. 2A. Also, the device 14 may suffer from greater electrofluidic cross-talk between adjacent electrode pads or segments in each channel 314, 324. However, in an alternate embodiment of the present invention, a highly porous film 44 may be combined with the splitting features 52, 53 (FIGS. 1A, 2A), to obtain more rapid movement of non-polar fluid 224 between the channels 314, 324.

Figure 4:
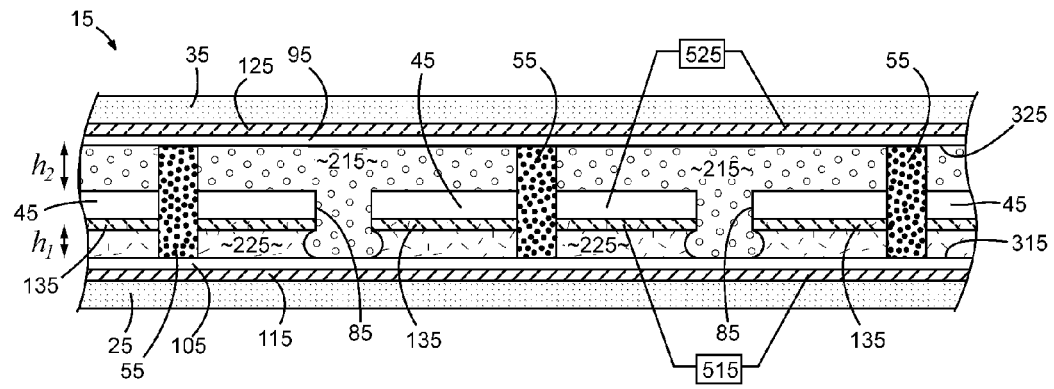
FIG. 4 is a cross-sectional view through a display device in accordance with one embodiment of the present invention.

With reference now to FIG. 4, a device 15 in accordance with an alternate embodiment of the present invention is described. The device 15 includes a first substrate 25 with a first electrode 115 and first dielectric 105, a second substrate 35 with a second electrode 125 and second dielectric 95, a film 45 with a third electrode 135 and located between and spaced away from the first and second substrates 25, 35, and a plurality of spacers 55 that are porous to non-polar fluid 225. The channel heights ($h_1$, $h_2$) of the first and second channels 315, 325 are also different such that in the absence of an applied voltage, the Laplace pressure will move the polar fluid 215 into the channel having a greater height (shown specifically as the second channel 325, $h_2$). Although not shown, the device 15 may be constructed without the second electrode 125 and second dielectric 95 on the second substrate 35. Use of the device 15 would utilize the Laplace pressure to move polar fluid 215 into the second channel 325 and the voltage source 515 would be utilized to move the polar fluid 215 into the first channel 315.

Figure 5:
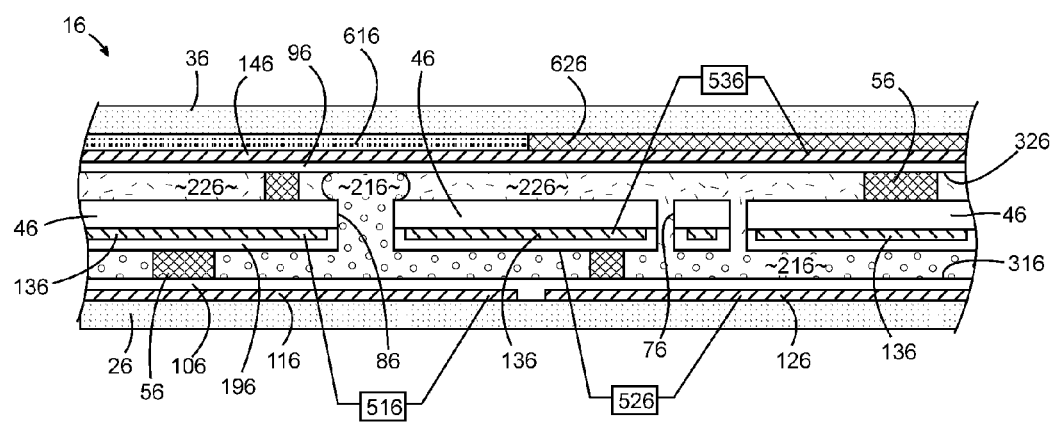
FIG. 5 is a cross-sectional view through a display device in accordance with another one embodiment of the present invention.

With reference to FIG. 5, a device 16 in accordance with still another embodiment of the present invention is shown. The device 16 includes a first substrate 26 with a first patterned electrode 116 and a second patterned electrode 126, a second substrate 36 with a third electrode 146. The first and second patterned electrodes 116, 126 of the display device 16 may be connected to thin-film-transistors in an active-matrix addressing scheme as is well-known by those skilled in the art of displays. A film 46 positioned between and spaced away from the first and second substrates 26, 36 includes a fourth electrode 136 that is covered by a dielectric layer 196. The fourth electrode 136 with the dielectric layer 196 is, therefore, capable of applying an electromechanical force to the polar fluid 216. The device 16 further includes color filters 616, 626, which are commonly used for creating color reflective, or transflective displays. Black matrix and color filters may be any solid or fluid material that absorbs part of or the entire spectrum of light in reflection or transmission modes.

It would be readily appreciated that the fluid splitting spacers or other fluid splitting features, as generally provided in detail herein, may be incorporated into the fluid channels of other device structures. For example, conventional electrofluidic displays, such as those described in J. HEIKENFELD, et al., "Electrofluidic displays using Young-Laplace transposition of brilliant pigment dispersions," *Nature Photonics*. 3:292-296 (2009), may incorporate one or more spacers and polar fluid splitting techniques as described herein. Specifically, the electrofluidic displays of the reference include a channel into which a polar fluid is pulled (by an applied voltage) and a reservoir that receives the polar fluid when no voltage is applied. By incorporating the one or more fluid splitting spacers in accordance with an embodiment of the present invention, there is no need to precisely define the borders of adjacent pixels of the device, which otherwise would result in the polar fluid of adjacent pixels merging. Therefore, the spacers may be located within the channel to promote splitting of the polar fluid in that channel. It would be understood that a fluid splitting structure in accordance with an embodiment of the present invention may be used in alternative, or in addition, to the spacers. In an alternate embodiment, the reservoirs would be fluidically connected such that any imbalance in volumes of split polar fluid would be redistributed in the reservoirs. Furthermore, because pixel boundaries are not needed, more of the channel surface may be dedicated to the viewable area of the device where fluid movement takes place, making a more optically efficient reflective display with reflective efficiency greater than about 80%.

The fluid splitting structures or spacers according to one or more embodiments of the present invention may be included in energy harvesting applications. One such energy harvesting application was described in T. KRUPENKIN and J. A. TAYLOR, "Reverse electrowetting as a new approach to high-power energy harvesting," *Nature Communications*, 2:7322 (2011). Briefly, in an energy harvesting device, a reverse electrowetting device may be used to generate electrical energy. While the reverse electrowetting devices do not directly cause a change in fluid occupancy within one or more channels, incorporating fluid spitting spacers in accordance with one or more embodiments of the present invention would provide particular benefits. For example, and with reference again to the device 12 of FIG. 1A, the first and second channels 312, 322 may have differing heights, with one height being greater than the height of the spacers 52. An applied voltage from the voltage sources 512, 522 would cause the polar fluid 212 to occupy the channel having the greater height due, at least in part, to Laplace pressure. An external stimulus (not shown) may then apply a pressure to the first and/or second substrates 22, 32 in a direction so as to bring the first and second substrates 22, 32 closer together. The increase in the Laplace pressure of the polar fluid 212 would cause the polar fluid 212 to move into the channel with imparting lower pressure due to electromechanical and Laplace pressures. As the polar fluid 212 moves between the channels 312, 322, the charge on one of the dielectrics layers 102, 92 changes and creates a current flow in the respective voltage source 512, 522. The current flow may be collected as power if an electrical load is in electrical series with the voltage sources. The splitting spacers and features, and the channel geometries of the present invention, provide a simpler, faster, and more energetic means of energy harvesting than the device structures reported by T. KRUPENKIN and J. A. TAYLOR. Any such energy harvesting device that relies on fluid splitting structures of the present invention is an alternate embodiment of the present invention. Furthermore, only one electrically-insulated electrode is required in an alternate embodiment of the present invention, because external stimulus in some cases may be the only stimulus needed to move the polar fluid for purposes of energy harvesting. By specifying the example of energy harvesting, it is clear that alternate embodiments of the present invention include other possible applications beyond displays and energy harvesting, even though not specifically mentioned herein.

Regarding fabrication of the film, devices in accordance with one or more embodiments of the present invention may be constructed in a variety of ways. In one such embodiment of the present invention, fabrication of the film included in the device may include techniques that are known and include, for example, microelectronics, microreplication, light management films, membrane filtration films, or other thin porous or structured films. The films may be fabricated with spacers, the spacers fabricated by microreplication; depositing a photo-definable polymer and using photolithography to develop the spacer; laser etching; screen printing; or other suitable approaches. In those embodiments in which the film includes one or more pores, the pores may be formed by microreplication; wet or plasma etching; laser ablation; photolithography; or other suitable approaches. In those embodiments in which the film is very thin, the film may be fabricated on a carrier to facilitate ease of handling and/or lamination of the thin film. More specifically, in one embodiment of the present invention, a film may be fabricated from a carrier substrate having one or more trenches, which are the inverse geometry of the spacers. The carrier substrate is coated with a negative-acting UV-curable epoxy like solvent-free SU-8 melted at greater than 55° C. or Norland epoxies used in microreplication. The pluralities of pores, small diameter, large diameter, or both, may be fabricated using photolithography of the epoxy. The porous film is then coated with a reflector if the film is not already reflective itself. In other embodiments, the pores in the films may be fabricated into a film of polycarbonate or polyethylene-terephthalate by ion-track etching (commonly used to create membrane filters). Alternately, UV exposure of polyethylene-terephthalate in a raised pressure and temperature formamide bath may allow photo-defined etching of pores. For some devices, it may be desirable to fabricate the films with monolithic integration onto a lower substrate, such as by layer-by-layer build-up.

Regarding bonding, when fabrication of a film is complete, the film with the carrier may then be bonded onto a lower substrate containing previously manufactured drive circuitry, spacers, and/or other features. The carrier may then be released from the film. An upper (i.e., the viewing) substrate may then be laminated onto the film and the lower substrate.

Regarding reflection, reflection may be achieved with metal films (for example, Al or Ag), but enhanced reflection may be achieved using one or more of several methods, such as, layers with different refractive indices, such as multilayer dielectrics; particle-filled polymers or fluids where the particles differ in refractive index from the polymer or fluid; one- or multi-dimensional photonic crystals; paper; porous materials; retroreflectors; or other known materials that may improve visible reflectance. In those embodiments in which the reflector is constructed from an electrically-conductive material, the reflector may also serve as an electrically-conductive electrode. Using reflector techniques known by those skilled in the art of displays, the achieved reflection may be diffuse, semi-diffuse, or directional.

Regarding fluid dosing and sealing, the fluids may be dosed into the device using one of several methods. For example, the polar fluid may be emulsed with the non-polar fluid and then physically, chemically, electrically, thermally, or optically separated after the device is completed. The polar fluid may be dosed into the device, the non-polar fluid added, and the device sealed. The non-polar fluid may be dosed into the device, the polar fluid added, and the device sealed. The polar fluid may be electrowetted into an area by application of a voltage between the polar fluid and an electrode. The polar fluid may be dosed and pressed between two plates as done for liquid crystal displays in "droplet dosing." Numerous alternatives and combinations of dosing combinations are included within the spirit of the present invention.

The above description provides examples of materials and components for embodiments of the invention; however, the description of any particular one embodiment is intended to cover all alternative materials, components, and arrangements known by those skilled in the arts of optics, displays, microfluidics, filtration and separations membranes, electrowetting, electrofluidics, microfabrication, electronics, and related disciplines.

The invention will be further appreciated in light of the following examples:

EXAMPLE 1

The display performance with respect to the various embodiments of the present invention may be calculated for pixel densities ranging from about 1 pixel-per-inch ("PPI") to about 1000 PPI. A review of performance requirements for devices is provided in J. HEIKENFELD, et al., "A critical review of the present and future prospects for electronic paper," *J. Soc. Inform. Display.* 19(2):129-156 (2011). Table 1 includes calculations made using proven models for electrofluidic transport, including light outcoupling losses, and are benchmarked off actual data measured for 25 PPI pixels (see Example 3). It is clear that various devices in accordance with one or more embodiments of the present invention may satisfy bill-board application pixel resolutions (1 PPI) and speeds (<1 s). It is clear that the present invention can satisfy tablet, phone, and e-reader applications (>300 PPI) where video rate (<20 ms) speed is required.

In terms of optical performance, several comparisons may be made. Firstly, the present invention is nearly twice as reflective as the E INK (E Ink Co., Cambridge, Mass.) electrophoretic displays (~80% vs. ~40%). In color mode, using a RGBW color filter approach, the E INK provides about 16% reflection by calculation, whereas the present invention could provide about 31% reflection. The present invention may also utilize color filters with fluorescent (photoluminescent) enhancement, bringing reflection to about 36%.

TABLE 1

|  | Pixel Density (PPI) | | | | |
| --- | --- | --- | --- | --- | --- |
|  | 1 | 25 | 100 | 500 | 1000 |
| Pitch Between Large Polar Fluid Pores (μm) | 12700 | 508 | 127 | 25.4 | 12.7 |
| Channel Height (μm) | 1270 | 50.8 | 12.7 | 2.54 | 1.27 |
| Large Polar Fluid Pore Diameter (μm) | 2540 | 101.6 | 25.4 | 5.08 | 2.54 |
| % Area for Large Polar Fluid Pores | 1.57% | 1.57% | 1.57% | 1.57% | 1.57% |
| Small Non-Polar Fluid Pore Diameter (μm) | 635 | 25.4 | 6.35 | 1.27 | 0.635 |

TABLE 1-continued

|  | Pixel Density (PPI) | | | | |
| --- | --- | --- | --- | --- | --- |
|  | 1 | 25 | 100 | 500 | 1000 |
| % Area for Small Non-Polar Fluid Pores | 1.57% | 1.57% | 1.57% | 1.57% | 1.57% |
| Black Splitting Spacer Length (μm) | 6350 | 254 | 63.5 | 12.7 | 6.35 |
| Black Splitting Spacer Width (μm) | 1270 | 50.8 | 12.7 | 2.54 | 1.27 |
| % Area for Black Splitting Spacer | 5% | 5% | 5% | 5% | 5% |
| % Area Reflective | 92% | 92% | 92% | 92% | 92% |
| % Reflection With 95% Reflection for Film | 77% | 77% | 77% | 77% | 77% |
| Contrast Ratio (Assume 3% Non-specular) | 30 | 30 | 30 | 30 | 30 |
| Switching Speed (ms) | 750 | 30 | 7.5 | fast | fast |
| Film Thickness (μm) | 15 | 15 | 10 | 5 | 5 |

EXAMPLE 2

Two display devices were fabricated in a manner as described in S. YANG, et al., "High reflectivity electrofluidic pixels with zero-power grayscale operation," *Appl. Phys. Lett.* 97(14): 143501-143503 (2010).

The first device was fabricated in the exact same manner described in the reference, but without spacers in the upper channel. When tested, the polar fluid merged between pixels in the upper channel and could not be returned to the lower channel. The merging and degradation of the display device worsened over time.

The second device was fabricated in the exact same manner described in the publication, but without aligning the channels to the segmented electrodes on the lower substrate. Pixels partially spanning the edges of the segmented electrodes only partially operated or failed to operate because of the lack of alignment with a complete electrode.

EXAMPLE 3

Figure 6A:
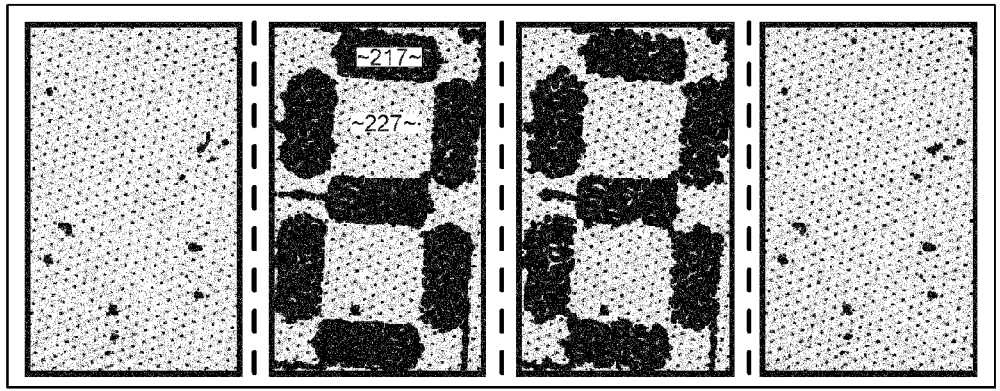
FIG. 6A is a photograph of a display device constructed and operated in accordance with one embodiment of the present invention and displaying an alphanumeric symbol.
Figure 6B:
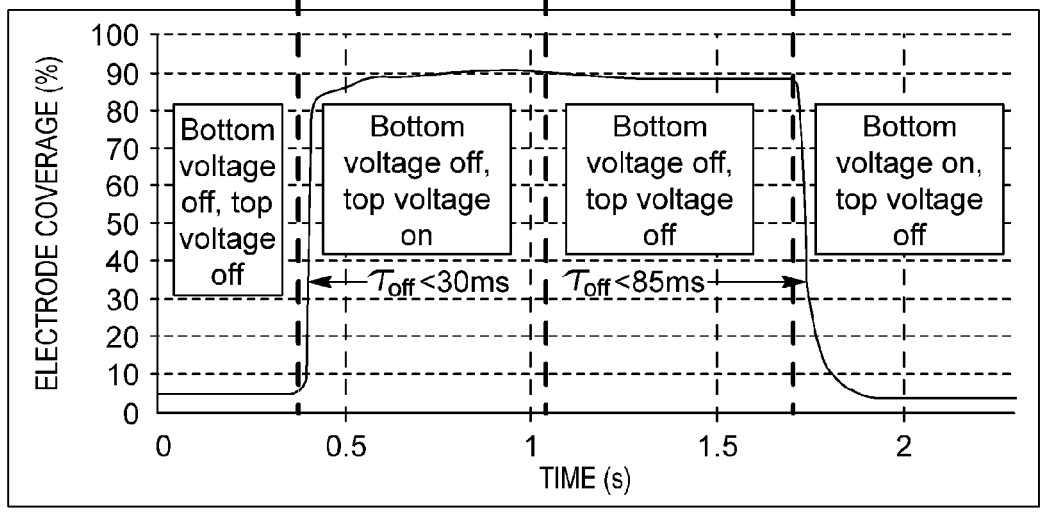
FIG. 6B is a graphical view illustrating the response time for the display device of FIG. 6A, which is operated in accordance with one exemplary mode.
Figure 6C:
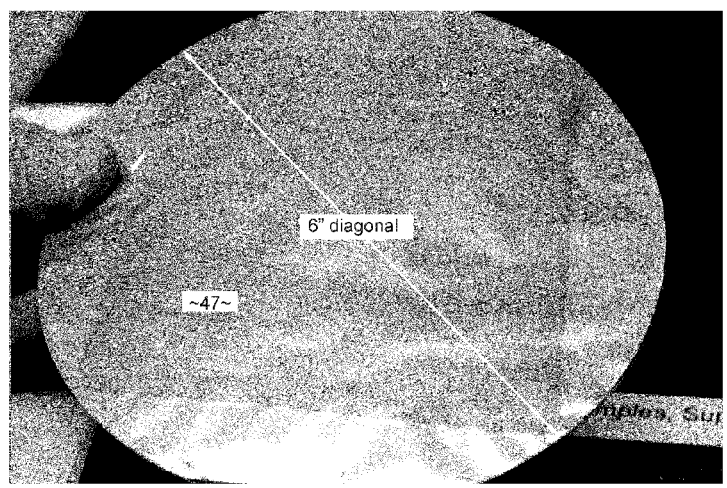
FIG. 6C is a photograph of the third substrate film used in the display device of FIG. 6A.

Devices were fabricated from multiple 6 inch polycarbonate porous films, which were obtained from Structure Probe, Inc. (West Chester, Pa.) with small 10 μm diameter pores and a pore density of $8 \times 10^5$ per square inch. A low cost $CO_2$ laser-engraving machine was then used to mill into the film an array of larger 100 μm pores in a hexagonal lattice having a lattice constant of about 500 μm. This porous film was then sputter coated with about 100 nm of reflective and conductive Al. The film was then dip-coated in diluted Cytonix 1601V fluoropolymer solution and baked at 50° C. to form a 50 nm thick non-electrically-insulating hydrophobic coating. One of two 6 inch glass substrates was patterned with various segmented and transparent $In_2O_3$:$SnO_2$ electrode test patterns, patterned with 50 μm thick and 200 μm long spacers, insulated with 1 μm of Parylene C dielectric, and similarly coated with fluoropolymer. The other one of the two 6 inch glass substrates was formed in a manner similar to the first substrate, but the transparent electrode was un-patterned. Polar fluids containing a red pigment dispersion (Sun Chemical Corp., Parsippany, N.J.) and a non-polar silicone fluid were dosed between the film and substrates as they were laminated together. A first voltage source was connected between the electrode on the first substrate and the electrode on the film, and a second voltage source was connected between the electrode on the second substrate and the electrode on the film. The fabricated devices were viewed through the first substrate and operated as described above with reference to FIG. 1A-1K, where sequentially from left-to-right in FIGS. 6A and 6B experimental results are show for: bottom substrate no voltage, top substrate no voltage; bottom substrate no voltage, top substrate voltage; bottom substrate no voltage, top substrate no voltage; bottom substrate voltage, top substrate no voltage. The photos in FIG. 6A are of 2500 μm segments in an alphanumeric "8" representation. Even though the fabricated film was low resolution (similar to the 25 PPI film described in Table 1) the device exhibited switching speeds as fast as about 30 ms. A photograph of the fabricated film is shown in FIG. 6C.

While the present invention has been illustrated by a description of various illustrative embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or any combinations depending on the needs and preferences of the user. However, the invention itself should only be defined by the appended claims.

What is claimed is:

1. A display device comprising:
    a first substrate;
    a second substrate positioned relative to the first substrate so as to define a fluid space;
    a polar fluid occupying at least a portion of the fluid space;
    a non-polar fluid occupying a portion of the fluid space that is not occupied by the polar fluid;
    a third substrate positioned between and spaced away from the first and second substrates so as to form a first channel and a second channel, respectively, within the fluid space, the third substrate including a first plurality of pores being porous to the polar fluid and a second plurality of pores being porous to the non-polar fluid;
    a first electrically-insulated electrode positioned in the first channel;
    a second electrically-insulated electrode positioned in the second channel;
    at least one voltage source configured to apply an electrical bias to at least one of the first and second electrically-insulated electrodes so as to move the polar fluid within the fluid space and with respect to the first and second channels; and
    at least one fluid splitting structure positioned in each of the first and second channels, each of the fluid splitting structures being configured to facilitate movement of the non-polar fluid into a portion of the polar fluid so as to split the polar fluid.

2. The display device of claim 1, wherein the polar and nonpolar fluids are visible through at least one of the first and second substrates.

3. The display device of claim 2, wherein the at least one fluid splitting structure is optically transmissive and enables optical transmission of light through the first and second substrates for at least one position of the polar fluid.

4. The display device of claim 1, wherein movement of the polar fluid is perceived as a change in at least one spectral property of the display device.

5. The display device of claim 4, wherein the at least one spectral property is at least one property of light incident on the display device.

6. The display device of claim 1, wherein the at least one fluid splitting structure is further configured to impart a radius of curvature on the portion of the polar fluid relative to a radius of curvature of the non-polar fluid so that the non-polar fluid splits the portion of the polar fluid.

7. The display device of claim 1, wherein each of the first plurality of pores has a geometry operable to provide a Laplace pressure to the polar fluid that is lower than a Laplace pressure of the polar fluid in either of the first or second channels when no electrical bias is applied to the first or second electrically-insulated electrodes.

8. The display device of claim 1, wherein the polar fluid fills the first plurality of pores.

9. The display device of claim 1, wherein each of the second plurality of pores has a geometry operable to provide a Laplace pressure for the polar fluid that is higher than the Laplace pressure of the polar fluid in either of the first and second channels when no electrical bias is applied to the first or second electrically-insulated electrode.

10. The display device of claim 1, wherein the non-polar fluid fills the second plurality of pores.

11. The display device of claim 1, wherein at least one of the second plurality of pores is positioned proximate to the at least one fluid splitting feature such that the non-polar fluid may split an adjacent portion of the polar fluid.

12. The display device of claim 1, wherein the third substrate is a film.

13. The display device of claim 12, wherein the film is optically reflective.

14. The display device of claim 1, wherein the at least one fluid splitting structure is a surface of the first channel or the second channel.

15. The display device of claim 1, wherein the at least one fluid splitting structure is porous to the non-polar fluid.

16. The display device of claim 1, wherein the third substrate further includes a third electrode.

17. The display device of claim 16, wherein the third electrode is optically reflective.

18. The display device of claim 16, wherein the third electrode is electrically-insulated by a dielectric layer.

19. The display device of claim 1, wherein the at least one fluid splitting structure is at least one spacer and is further operable to define a minimum dimension of at least one of the first and second channels.

20. The display device of claim 1, wherein the first channel has a first height and the second channel has a second height.

21. The display device of claim 20, wherein the at least one fluid splitting structure is at least one spacer,
wherein the at least one spacer is positioned in each of the first and second channels, the spacers being operable to define minimum dimensions of respective first and second channels.

22. The display device of claim 21, wherein the first height is approximately equal to the second height and the polar fluid simultaneously, and at least partially, fills both of the first channel and second channel without an applied electrical bias.

23. The display device of claim 21, wherein the height of the first channel is greater than the height of the second channel so as to cause the polar fluid to move to the first channel without applied voltage.

24. The display device of claim 21, wherein the at least one spacer is configured to isolate at least a portion of the polar fluid in either of the first channel or the second channel.

25. The display device of claim 1 wherein the at least one fluid splitting structure positioned in the first channel comprises a first spacer at a first position in the first channel and the at least one fluid splitting structure in the second channel comprises a second spacer at a second position in the second channel,
wherein the first position is at least partly vertically aligned with the second position and the first and second spacers are configured to support the third substrate.

26. The display device of claim 1, wherein the polar fluid is configured to separately move through at least two of the first plurality of pores and to merge in at least one of the first and second channels.

27. The display device of claim 1, wherein applying the electrical bias to the second electrically-insulated electrode in the second channel is operable to draw the polar fluid into the second channel for a first visual state and applying the electrical bias to the first electrically-insulated electrode in the first channel is operable to draw the polar fluid into the first channel for a second visual state.

28. The display device of claim 27, wherein the first visual state includes a first perceived color and the second visual state includes a second perceived color.

29. The display device of claim 27, wherein the first visual state includes a perceived information display and the second visual state removes the perceived information display.

30. A display comprising a plurality of display devices in accordance with claim 1.

31. A device comprising:
a first substrate;
a second substrate positioned relative to the first substrate so as to define a fluid space;
a polar fluid occupying at least a portion of the fluid space;
a non-polar fluid occupying a portion of the fluid space that is not occupied by the polar fluid;
a third substrate positioned between and spaced away from the first and second substrates so as to form a first channel and a second channel, respectively, within the fluid space, the third substrate including a first plurality of pores being porous to the polar fluid and a second plurality of pores being porous to the non-polar fluid;
at least one electrically-insulated electrode positioned in the first or second channel;
at least one voltage source configured to apply an electrical bias to the at least one electrically-insulated electrode; and
at least one fluid splitting structure positioned in each of the first and second channels, each of the fluid splitting structures being configured to facilitate movement of the non-polar fluid into a portion of the polar fluid so as to split the polar fluid,
wherein the polar fluid is configured to separately move through at least two of the first plurality of pores and to merge in at least one of the first and second channels.

32. The device of claim 31, wherein the first channel has a first height and the second channel has a second height, the device further comprising:
an electrical load electrically-coupled to the at least one voltage source; and
at least the first substrate being configured to be moveable with respect to the second substrate,
wherein movement of the first substrate toward the second substrate creates an internal pressure that moves the polar fluid within the fluid spaces, the internal pressure being operable to generate an electrical current that provides an electrical power to the electrical load.

33. A method of fabricating a display pixel, the method comprising:
fabricating a first electrode on a first substrate;
fabricating a second electrode on a second substrate;
securing the first substrate to the second substrate so as to create a fluid space therebetween;
positioning at least one film between and spaced away from the first and second substrates so as to form a first channel and a second channel, respectively, within the fluid space, the film being supported by at least one spacer in each of the first and second channels, and being porous to at least one fluid;
dosing a first fluid into at least a portion of the fluid space; and
dosing a second fluid into a portion of the fluid space that is not occupied by the first fluid,
wherein each of the spacers is positioned within the fluid space so as to facilitate movement of non-polar fluid so as to split a portion of a polar fluid.

34. A method of operating a display pixel, the display pixel having a first substrate, a second substrate positioned relative to the first substrate so as to define a fluid space, a third substrate positioned between and away from the first and second substrates so as to form a first channel and a second channel, respectively, within the fluid space, at least one spacer positioned in each of the first and second channels, a polar fluid occupying at least a portion of the fluid space, and a non-polar fluid occupying a portion of the fluid space that is not occupied by the polar fluid, the method comprising:
directing the polar fluid so as to surround the at least one spacer, the polar fluid having a first radius of curvature at the at least one spacer and a second radius curvature at a position spaced away from the first radius of curvature; and
applying a biasing energy to an electrode that is electrically coupled to the polar fluid to increase the second radius of curvature,
wherein increasing the second radius of curvature moves the non-polar fluid toward the at least one spacer and into the polar fluid so as to split the polar fluid into at least two volumes.

* * * * *

UNITED STATES PATENT AND TRADEMARK OFFICE
CERTIFICATE OF CORRECTION

| | | |
|---|---|---|
| PATENT NO. | : 8,693,081 B2 | Page 1 of 1 |
| APPLICATION NO. | : 13/248826 | |
| DATED | : April 8, 2014 | |
| INVENTOR(S) | : Jason Heikenfeld et al. | |

It is certified that error appears in the above-identified patent and that said Letters Patent is hereby corrected as shown below:

On the Title Page

Item (75), Inventor name "Kenneth Dean Andrew" should be --Kenneth Andrew Dean--.

In the Specification

Column 1,
Lines 47-48, "higher in maximum resolution," should be --higher maximum resolution,--.

Column 2,
Line 18, "in second channel." should be --in the second channel.--.
Lines 37-38, "in second channel." should be --in the second channel.--.

Column 3,
Line 2, "has a second radius curvature" should be --has a second radius of curvature--.

Column 7,
Line 65, "principle" should be --principal--.

Column 10,
Line 15, "will return the state shown" should be --will return to the state shown--.
Lines 54-55, "An optimized a regular geometry" should be --An optimized regular geometry--.

In the Claims

Column 20,
Line 11 (claim 34), "the at least one spacer and a second radius curvature" should be --the at least one spacer and a second radius of curvature--.

Signed and Sealed this
Twelfth Day of August, 2014

Michelle K. Lee
*Deputy Director of the United States Patent and Trademark Office*